United States Patent
Tsui et al.

(10) Patent No.: US 7,167,513 B2
(45) Date of Patent: Jan. 23, 2007

(54) IQ IMBALANCE CORRECTION

(75) Inventors: Ernest T. Tsui, Cupertino, CA (US); Jian Lin, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 753 days.

(21) Appl. No.: 10/038,860

(22) Filed: Dec. 31, 2001

(65) Prior Publication Data

US 2003/0123534 A1 Jul. 3, 2003

(51) Int. Cl.
- *H03H 7/30* (2006.01)
- *H03H 7/40* (2006.01)
- *H03K 5/159* (2006.01)

(52) U.S. Cl. .................. 375/229; 333/18; 333/28; 342/194; 375/147; 375/296; 375/324; 375/346; 708/300; 708/819

(58) Field of Classification Search .............. 342/194; 375/147, 296, 324, 346
See application file for complete search history.

(56) References Cited

U.S. PATENT DOCUMENTS

| | | | | | |
|---|---|---|---|---|---|
| 5,872,538 | A | * | 2/1999 | Fowler | 342/194 |
| 6,035,004 | A | * | 3/2000 | Nakata | 375/340 |
| 6,370,211 | B1 | * | 4/2002 | Carsello | 375/346 |
| 6,421,397 | B1 | * | 7/2002 | McVey | 375/308 |
| 6,421,398 | B1 | * | 7/2002 | McVey | 375/308 |
| 6,434,204 | B1 | * | 8/2002 | Amir et al. | 375/346 |
| 2002/0097812 | A1 | * | 7/2002 | Wiss | 375/316 |
| 2002/0176522 | A1 | * | 11/2002 | Fan | 375/34 |
| 2003/0095589 | A1 | * | 5/2003 | Jeong | 375/147 |

FOREIGN PATENT DOCUMENTS

JP 2003087344 A * 3/2003

* cited by examiner

*Primary Examiner*—Stephen Chin
*Assistant Examiner*—Erin M. File
(74) *Attorney, Agent, or Firm*—Fish & Richardson P.C.

(57) ABSTRACT

An in-phase and guadrature (IQ) imbalance error-correction method includes estimating, on the basis of a constellation error in a received orthogonal frequency division multiplexing (OFDM) signal, an extent of an I/Q imbalance error, caused by direct IQ conversion of the received OFDM signal. On the basis of that extent, an equalizing transformation that reduces that error is estimated.

18 Claims, 2 Drawing Sheets

IQ IMBALANCE CORRECTION

FIELD OF INVENTION

This invention relates to wireless data transmission.

BACKGROUND

In a QAM ("quadrature amplitude modulation") data transmission system, the in-phase ("I") and quadrature ("Q") components of a signal identify a symbol being carried by that signal. To transmit a desired symbol, the IQ components corresponding to that symbol must be modulated onto a carrier wave. In a direct modulation system, the IQ ratio is modulated by controlling the amplitudes of two sinusoids separated by ninety degrees in phase. When these two sinusoids are combined, the resulting signal defines a point (hereafter referred to as the "received point") in the IQ plane.

A set of constellation points in the IQ plane defines the set of symbols that can be transmitted. To the extent that a received point fails to align perfectly with a constellation point corresponding to the desired symbol, an IQ imbalance error may have been introduced.

The extent to which such IQ imbalance errors can be tolerated depends on the distribution of constellation points. For example, in a QPSK system, there are only four constellation points, one in each quadrant of the IQ plane. As a result, so long as the IQ imbalance error leaves the received point in the correct quadrant, there is no symbol transmission error. However, in a modern 64-QAM system, sixty-four constellation points crowd the IQ plane. As a result, even a modest IQ imbalance error can easily place the received point near the wrong constellation point. This results in a symbol transmission error.

To increase data transmission speed, it is desirable to send several symbols at the same time. This can be achieved by concurrently transmitting each of several symbols onto carriers having different frequencies. To avoid interference between the carriers without consuming excessive bandwidth, the carrier frequencies are selected such that the peak of the spectrum of any one carrier coincides with nulls of the spectra of all other carriers. This technique, referred to as "orthogonal frequency division multiplexing" ("OFDM") enables several carriers to share a small bandwidth without interfering with each other. In the context of OFDM, these individual carriers are often referred to as "sub-carriers".

In a data transmission system, a variety of mishaps along the data transmission channel conspire to introduce IQ imbalance errors into the signal as it makes its way from the transmitter to the receiver. For example, as a result of aging, temperature effects, or imperfections in their design, the electronic components that carry out modulation at the transmitter or demodulation at the receiver may fail to generate two sinusoids that are perfectly matched in amplitude and perfectly orthogonal in phase.

DETAILED DESCRIPTION

The invention provides a method and system for adaptively calibrating a receiver to correct for IQ imbalance errors arising from direct conversion of a signal. As used here, direct conversion refers to both direct up-conversion, as performed by a transmitter, and direct down-conversion, as performed by a receiver. Since the receiver calibration is carried out without relying on information about the transmitter, the receiver can correct IQ imbalance errors with contributions from a variety of transmitters made by different manufacturers.

Figure 1:
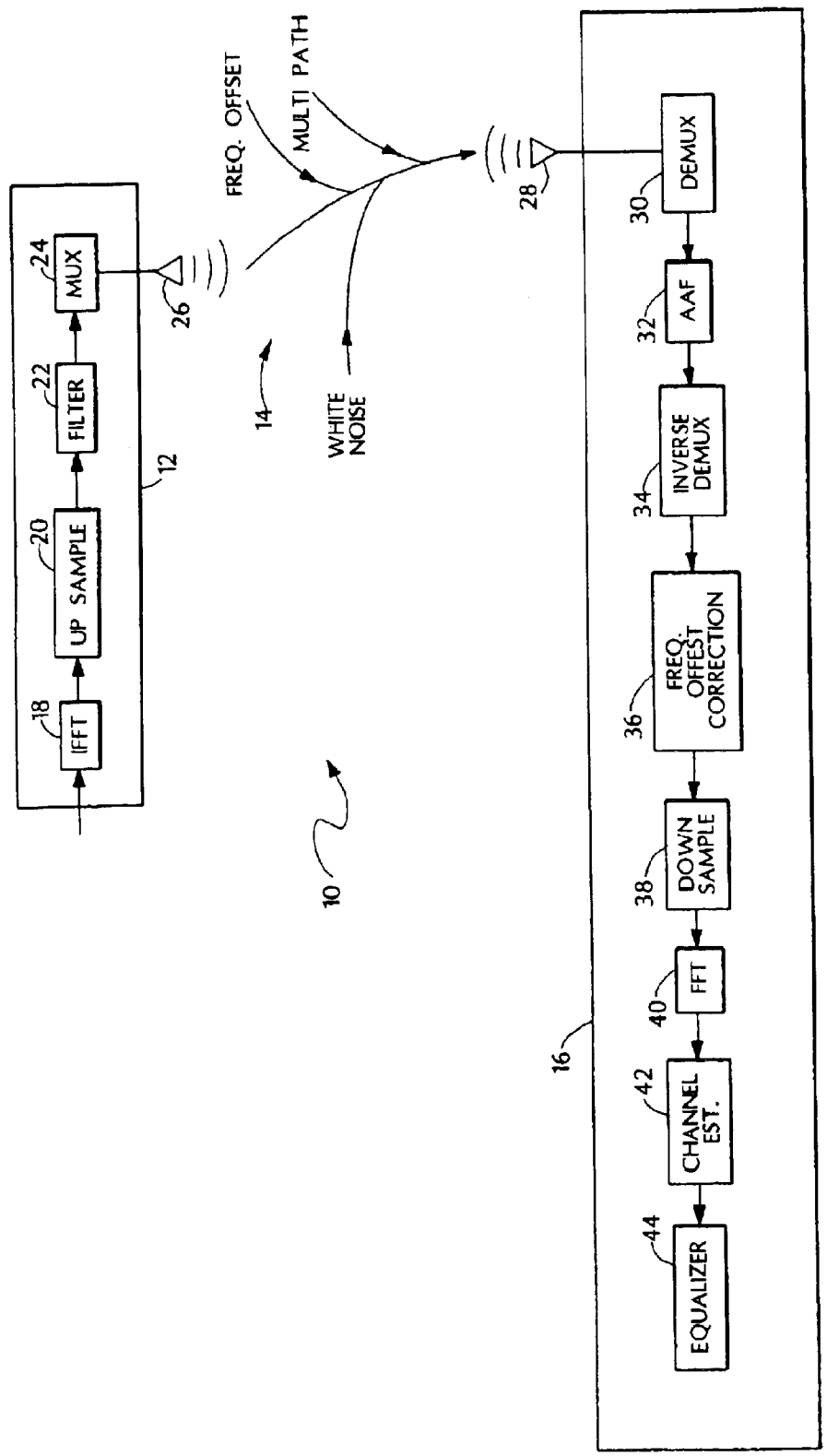
FIG. 1 shows a data communication system.

FIG. 1 shows a data transmission system 10 having a remote transmitter 12, a transmission channel 14, and a local receiver 16. Within the remote transmitter 12, an IFFT block 18 generates a time-domain representation of an input signal containing the symbols to be transmitted. The IFFT block 18 provides this time-domain representation to an up-sampler 20, the output of which is filtered by a transmitter filter 22. The output of the transmitter filter 22 is then provided to a multiplexer 24 that modulates each subcarrier with one of the symbols to be transmitted. This multiplexer 24 introduces a source of IQ imbalance error.

From the multiplexer 24, the subcarriers radiate from a transmitting antenna 26 and enter the transmission channel 14. Along the way, they encounter additional sources of distortion. For example, reflections from obstacles can result in multipath errors. In some cases, the frequencies of the subcarriers may be shifted.

A receiving antenna 28 at the local receiver 16 captures the subcarriers, together with any white noise in the environment and any other interfering signals. This hodgepodge of signals is then provided to a demultiplexer 30, which introduces another source of IQ imbalance error. The output of the demultiplexer 30 is provided to an anti-alias filter 32 and then to an inverse demultiplexer 34 whose function is to remove any IQ imbalance introduced by the demultiplexer 30. The resulting signal is then provided to a frequency-offset-correction block 36 to correct IQ imbalance resulting from frequency offset errors that exist because of any mismatches between the resonant frequency of an oscillator at the local receiver and the corresponding resonant frequency of an oscillator at the remote transmitter.

The output of the frequency-offset-correction block is then sampled by a down-sampler 38 and provided to an FFT block 40. The FFT block 40 provides a frequency-domain representation of the signal to a channel-estimation-and-correction block 42 that removes errors resulting from multipath along the transmission channel 14. This results in a received signal that, except for any residual IQ imbalance errors, is essentially identical to the input signal provided to the remote transmitter 12.

Figure 2:
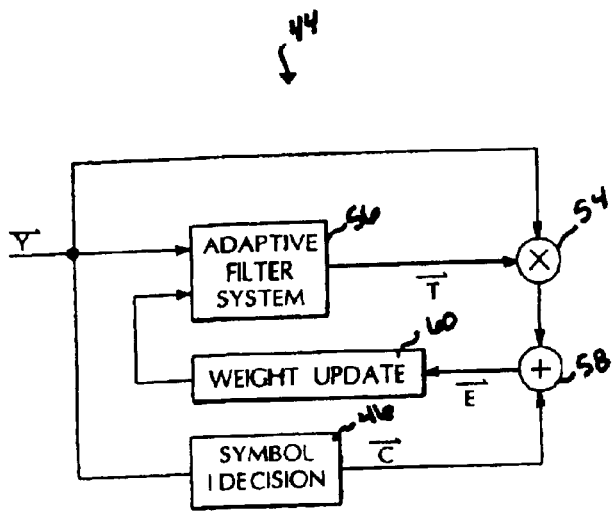
FIG. 2 shows an equalizer.

The received signal is provided to an equalizer 44, shown in more detail in FIG. 2. Within the equalizer 44 the received signal is provided to a symbol-decision block 46. The symbol-decision block 46 then determines the constellation point in the IQ plane that lies closest, in a Euclidean sense, to the received point in the IQ plane.

Figure 3:
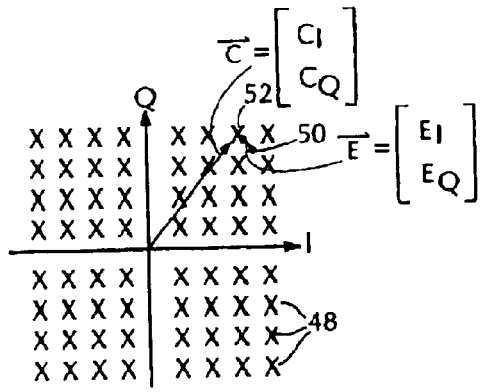
FIG. 3 shows points in an IQ plane.

FIG. 3 shows an exemplary IQ plane having constellation points 48 distributed throughout four quadrants. These constellation points 48 represent the possible symbols that are understood by the data transmission system 10. Also shown in FIG. 3 is a received point 50 corresponding to the received signal. As a result of IQ imbalance error, the received point 50 does not coincide with any of the constellation points 48. Nevertheless, there does exist a constellation point 52 that lies nearest to the received point 50 in the IQ plane. This nearest constellation-point 52 is defined by a two-dimensional constellation vector c having components $c_I$ and $c_Q$ representative of in-phase and quadrature components of the nearest constellation-point 52. This nearest constellation-point 52, which is assumed to correspond to the symbol that the received point 50 attempts to communicate, forms the output of the symbol-decision block 46.

Referring back to FIG. 2, the received signal is also provided to a multiplier 54, which combines it with the output of an adaptive-filter system 56. The output of the adaptive-filter system 56, which can be represented as a 2×2 composite equalizing-matrix "W", is selected such that the equalized signal provided at the output of the multiplier 54 approximates the input to the remote transmitter 12. The reason the equalizing matrix is a "composite" equalizing-matrix will be apparent from the discussion of FIG. 3.

A differencing element 58 receives the equalized signal and the nearest constellation-point 52 from the symbol-decision block 46. The output of the differencing element 58 is an error signal indicative of the difference between these two quantities. This difference is characterized in FIG. 3 by a two-dimensional error vector $\epsilon$, having components $\epsilon_I$ and $\epsilon_Q$ representative of in-phase and quadrature components, that characterizes the extent of the IQ imbalance. This error signal is then provided to a weight-update block 60.

The weight-update block 60 then determines a new composite equalizing-matrix that, when used to generate another equalized signal, further reduces the magnitude of the error signal. The output of the weight-update block 60 is then provided back to the adaptive-filter system 56, which then replaces its composite equalizing-matrix with a new composite equalizing-matrix as provided by the weight-update block 60. This new composite equalizing-matrix is then used to generate a new equalized signal. The process continues until the magnitude of the error signal reaches a minimum or a pre-defined threshold. The error signal thus functions as a feedback signal for adjusting the composite equalizing-matrix on the basis of the extent to which the equalized signal differs from the nearest constellation-point 52.

Figure 4:
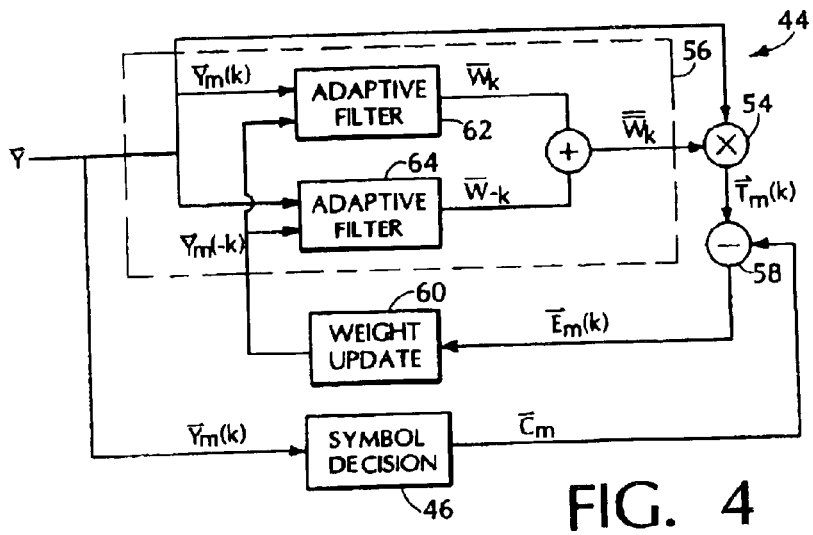
FIG. 4 shows an adaptive filter.

FIG. 4 shows in more detail the manner in which the adaptive-filter system 56 uses both the positive and negative frequency components of the received signal to generate the composite equalizing-matrix. The adaptive-filter system 56 includes a first adaptive filter 62 for generating a positive-frequency equalizing-matrix from the positive frequency components of the received signal and a second adaptive filter 64 for generating a negative-frequency equalizing-matrix from the negative-frequency components of the received signal. The positive-frequency equalizing-matrix and the negative-frequency equalizing-matrix are then provided to a summer 66, the output of which is the composite equalizing-matrix.

Within the weight-update block 60, the four weighting coefficients that make up the composite equalizing-matrix are updated by incrementing the previous weighting coefficients by an amount proportional to the corresponding error signal and to the received signal. The constant of proportionality is selected to control the speed of convergence. A constant chosen to ensure rapid convergence is apt to result in an unstable system. Conversely, a constant chosen to ensure a stable system is apt to converge slowly.

In some cases, the IQ imbalance error is so great that the received signal does not correspond to the closest constellation point in the IQ plane. Multipath in the transmission channel can, in many cases, cause IQ imbalance errors of this magnitude. In some embodiments, the local receiver includes a channel-estimation-and-correction block 42 to correct these errors.

In the specialized case in which the data conforms to the IEEE 802.11a standard, the method carried out by a conventional channel-estimation-and-correction block 42 interferes with the operation of the equalizer 44. For example, to correct for multipath errors, the 802.11a standard provides a training signal that includes a pair of training bits for each subcarrier. One of the pair of training bits is associated with the positive frequency component of that subcarrier; the other is associated with the negative frequency component of that subcarrier. For half of the subcarriers, these training bits have the same sign. For the remaining half of the subcarriers, these training bits have different signs.

To accommodate this disparate treatment of different subcarriers in the training signal, the equalizer segregates the subcarriers into two classes and processes them separately. The first class includes those subcarriers for which the corresponding training bits in the training signal have the same sign. The second class includes those subcarriers for which the corresponding training bits in the training signal have different signs. IQ imbalance errors for symbols carried by subcarriers in both the first and second classes are corrected in the manner described above. Segregating subcarriers into two classes in this manner prevents the multipath correction performed on the first class from interfering with convergence of an equalizing matrix for subcarriers in the second class, and vice versa.

Other embodiments are within the scope of the following claims:

The invention claimed is:

1. A method comprising: estimating, on the basis of a constellation error in a received orthogonal frequency division multiplexed (OFDM) signal, an extent of an in-phase/quadrature (I/Q) imbalance error, caused by direct IQ conversion of said received OFDM signal; and on the basis of said extent, estimating an equalizing transformation that reduces said error, wherein estimating a transformation comprises evaluating an equalizer matrix.

2. The method of claim 1, further comprising applying said equalizing transformation to said received signal.

3. The method of claim 1, wherein estimating an extent of an I/Q imbalance error comprises estimating a transmitted symbol corresponding to said received OFDM signal.

4. The method of claim 1, wherein estimating a transformation comprises:
    evaluating a first transformation on the basis of a first portion of a spectrum of said OFDM signal;
    evaluating a second transformation on the basis of a second portion of said spectrum; and
    combining said first and second transformations to obtain said equalizing transformation.

5. The method of claim 4, further comprising selecting said second portion of said spectrum to include image frequency components of said spectrum.

6. The method of claim 5, wherein selecting said second portion to include image frequency components comprises selecting said second portion to include negative frequency components of said spectrum.

7. The method of claim 1, wherein estimating an equalizing transformation comprises estimating a frequency dependent transformation.

8. A receiver comprising: an I/Q imbalance estimator for estimating, on the basis of a constellation error of a received orthogonal frequency division multiplexed (OFDM) signal, an in-phase/quadrature (I/Q) imbalance error, caused by direct conversion of said received signal; an adaptive filter system in communication with said I/Q imbalance estimator for generating an equalizing transformation for reducing said I/Q imbalance error; and a weight-update block in communication with said adaptive filter system and said I/Q imbalance estimator, said weight-update block being configured to update weighting coefficients of said adaptive filter system on the basis of an error signal provided by said I/Q imbalance estimator.

9. The receiver of claim 8, further comprising a mixer in communication with said adaptive filter system for applying said equalizing transformation to said received signal.

10. The receiver of claim 8, wherein said adaptive filter system comprises a first adaptive filter for generating a first transformation on the basis of a first portion of a spectrum of said received OFDM signal and a second adaptive filter for generating a transformation on the basis of a second portion of said spectrum.

11. The receiver of claim 10, wherein said second adaptive filter is configured to receive a second portion that includes image frequency components of said spectrum.

12. The receiver of claim 11, wherein said second adaptive filter is configured to receive a second portion that includes negative frequency components of said spectrum.

13. An adaptive filter system comprising a first adaptive filter for generating a first transformation on the basis of a first portion of a received orthogonal frequency division multiplexed (OFDM) signal spectrum; and a second adaptive filter for generating a second transformation on the basis of a second portion of said spectrum; and a weight-update block in communication with each of said first and second adaptive filters, said weight-update block being configured to determine weighting coefficients for said first and second adaptive filters on the basis of an error signal.

14. The adaptive filter system of claim 13, wherein said second adaptive filter is configured to receive a second portion of said spectrum that includes image frequency components of said spectrum.

15. The adaptive filter system of claim 8, further comprising a weight-update block in communication with each of said first and second adaptive filters, said weight-update block being configured to determine weighting coefficients for said first and second adaptive filters on the basis of an error signal.

16. A transmitter comprising: an in-phase/quadrature (I/O) imbalance estimator for estimating, on the basis of a constellation error of an orthogonal frequency division multiplexed (OFDM) signal, an I/Q imbalance error, caused by direct conversion of said signal; and an adaptive filter system in communication with said I/Q imbalance estimator for generating an equalizing transformation for reducing said I/Q imbalance error; and a weight-update block in communication with each of said first and second adaptive filters, said weight-update block being configured to determine weighting coefficients for said first and second adaptive filters on the basis of an error signal.

17. The transmitter of claim 16, wherein said adaptive filter system comprises a first adaptive filter for generating a first transformation on the basis of a first portion of a spectrum of said OFDM signal and a second adaptive filter for generating a transformation on the basis of a second portion of said spectrum.

18. The transmitter of claim 17, wherein said second adaptive filter is configured to receive a second portion that includes image frequency components of said spectrum.

* * * * *